United States Patent
Zhang et al.

(10) Patent No.: US 8,713,318 B1
(45) Date of Patent: Apr. 29, 2014

(54) EMAIL CERTIFICATES

(75) Inventors: Xincheng Zhang, Sunnyvale, CA (US);
Dongmin Zhang, Sunnyvale, CA (US);
Jia Liu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 68 days.

(21) Appl. No.: 13/350,705

(22) Filed: Jan. 13, 2012

(51) Int. Cl.
*H04L 9/00* (2006.01)

(52) U.S. Cl.
USPC .......................................... 713/170; 713/175

(58) Field of Classification Search
USPC ......... 713/150, 156, 162, 170, 175, 189, 193; 726/2, 10
See application file for complete search history.

(56) References Cited

U.S. PATENT DOCUMENTS

| | | | |
|---|---|---|---|
| 7,127,741 B2 * | 10/2006 | Bandini et al. | .................. 726/14 |
| 8,032,750 B2 * | 10/2011 | Swedor et al. | ................ 713/170 |
| 2005/0114652 A1 * | 5/2005 | Swedor et al. | ................ 713/156 |
| 2007/0083749 A1 * | 4/2007 | Fang | ............................ 713/152 |

OTHER PUBLICATIONS

Garfinkel et al., "How to Make Secure Email Easier to Use", CHI 2005, Apr. 2-7, 2005, pp. 701-710.
Rothman, "Public-key encryption for dummies", NetworkWorldFusion, May 17, 1999, retrieved from <http://www.networkworld.com/news/64452_05-17-1999 html>.

\* cited by examiner

*Primary Examiner* — Hosuk Song
(74) *Attorney, Agent, or Firm* — McDermott Will & Emery LLP

(57) ABSTRACT

Systems and methods for providing an email certificate for an email message. In some aspects, a method includes receiving a request from a user for providing an email certificate for an email message, generating an email certificate by encrypting the email message, and sending the email certificate to the user.

17 Claims, 7 Drawing Sheets

EMAIL CERTIFICATES

BACKGROUND

The subject technology generally relates to email and, in particular, providing an email certificate for an email message.

Email is a communication tool for people around the world. Many transactions are done through emails.

SUMMARY

In one aspect, the disclosed subject matter can be embodied in a method that includes receiving a request from a user for providing an email certificate for an email message. The method may also include generating an email certificate for the email message by encrypting at least the content of the email message. The method may further include providing the email certificate to the user.

In one aspect, the disclosed subject matter can be embodied in a non-transitory computer-readable medium that includes instructions. The instructions include code for receiving a request from a user for providing an email certificate for an email message. The instructions may also include code for generating an email certificate for the email message. The instructions may further include code for providing the email certificate to the user.

In one aspect, the disclosed subject matter can be embodied in a system that includes a computer. The computer includes an email certificate generator which is configured to receive a request from a user for providing an email certificate for an email message, generate an email certificate for the email message by encrypting at least the content the email message, and provide the email certificate to the user.

Various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Sometimes, a user may want an official certificate for an email message sent or received, so that he/she may use the certificate as evidence of delivery of the email message. Therefore, it would be desirable to provide a system for providing email certificates for email messages.

Figure 1:
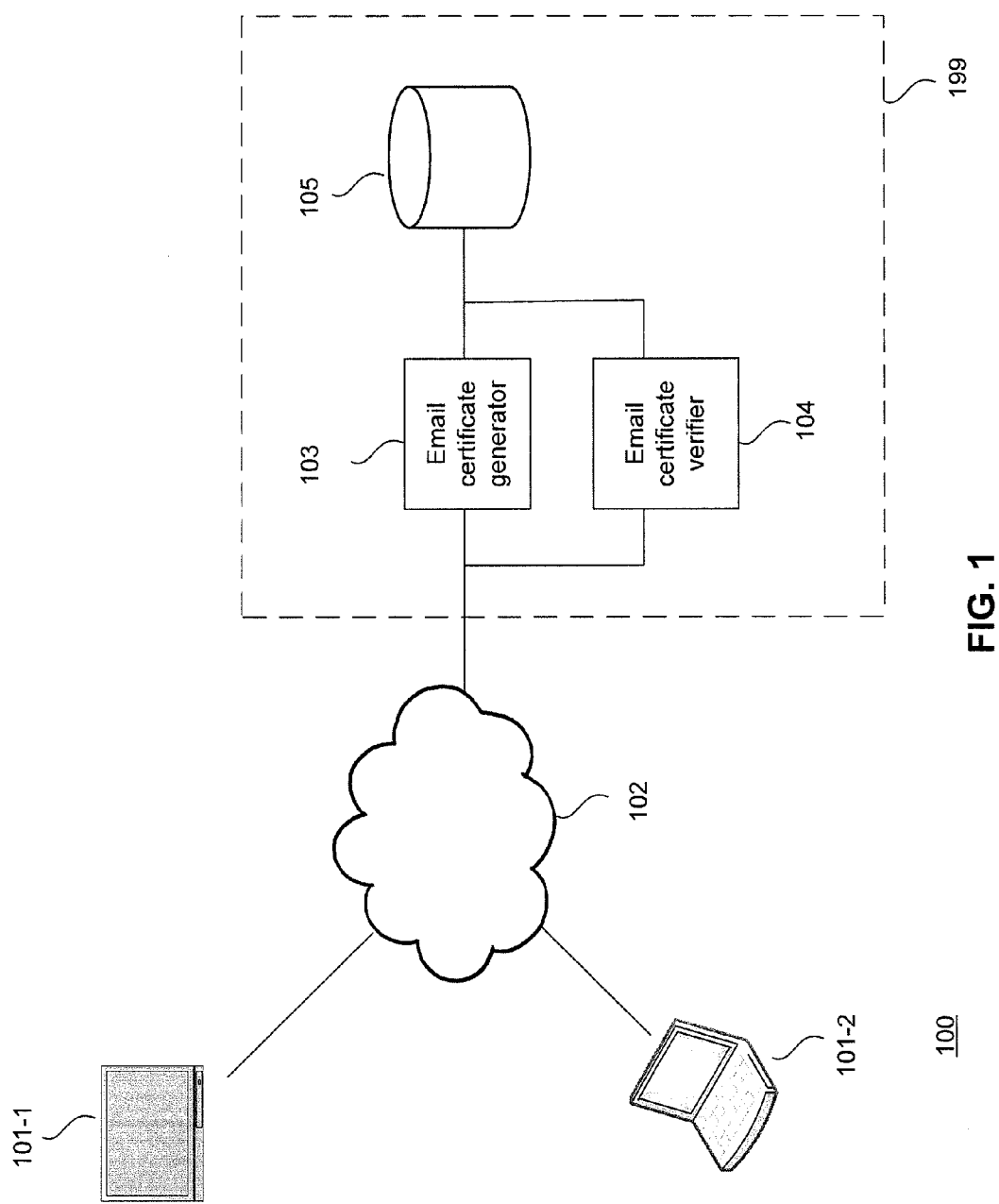
FIG. 1 illustrates a block diagram of an example system for providing an email certificate for an email message.

FIG. 1 illustrates a block diagram of an example system for providing an email certificate for an email message. As shown, a plurality of user devices, such as user devices 101-1 and 101-2, are coupled to an email certificate system 199 via a network 102. The network 102 may correspond to one or more of, e.g., the Internet, an intranet, a local area network, a cellular network or another communication network. The email certificate system 199 may have an email certificate generator 103, an email certificate verifier 104 and a storage device 105. A user may request an email certificate for an email message via a user interface, e.g., by clicking on a "Request Certificate" button (or similar graphical component) on a user interface. The email certificate generator 103 may receive the request over the network 102, and generate an email certificate for the email message, for example, by encrypting the email message. The email certificate generator 103 may then deliver the email certificate to the user. The email certificate may be stored in the storage device 105. A user may verify the email certificate for the email message via a user interface, e.g., by uploading the email certificate and clicking on a "Verify Certificate" button (or similar graphical component) on the user interface. The email certificate verifier 104 may receive the email certificate and the verification request over the network 102, and provide a copy of the email message, for example, by decrypting the email certificate.

Figure 2:
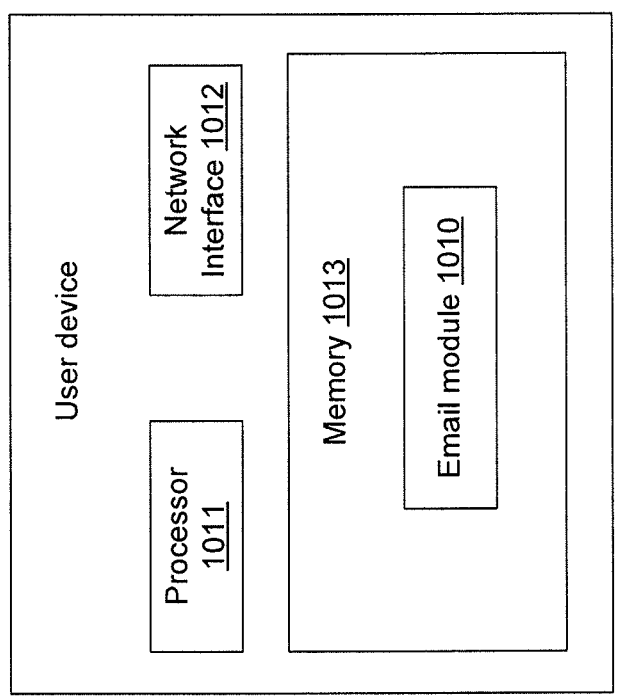
FIG. 2 illustrates a block diagram of an example of a user device shown in FIG. 1.

FIG. 2 illustrates a block diagram of an example of the user device 101-1 shown in FIG. 1. The user device 101-1 may include a processor 1011, a network interface 1012 and a memory 1013. The processor 1011 is configured to execute computer instructions that are stored in a computer-readable medium, for example, the memory 1013. The processor 1011 may be a central processing unit (CPU). The network interface 1012 is configured to allow the user device 101-1 to transmit and receive data in the network 102. The network interface 1032 may include one or more network interface cards (NICs). The memory 1013 stores data and instructions. As illustrated, the memory 1013 may store an email module 1010. The email module 1010 may provide a user interface for requesting an email certificate for an email message, e.g., by displaying a "Request Certificate" button (or similar graphical component) on a user interface for displaying an email received, sent or to be sent. The email module 1010 may also provide a user interface for verifying an email certificate, e.g., by displaying an "Upload Certificate" button (or similar graphical component) for a user to upload an email certificate to be verified, and a "Verify Certificate" button (or similar graphical component).

The user device 101-1 may be, e.g., a laptop computer, a desktop computer, a tablet computer, a mobile phone, a smartphone, or a personal digital assistant (PDA). Other devices can also implement the functionalities of the user device 101-1.

Figure 3:
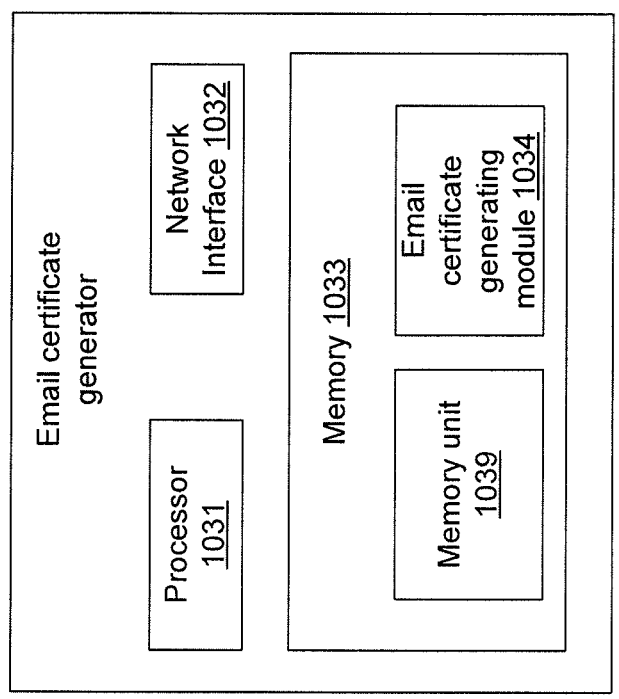
FIG. 3 illustrates a block diagram of an example of an email certificate generator shown in FIG. 1.

FIG. 3 illustrates a block diagram of an example of an email certificate generator 103 shown in FIG. 1. The email certificate generator 103 may be coupled to the user devices 101-1 and 101-2 via the network 102 to receive requests for email certificates. The email certificate generator 103 may include a processor 1031, a network interface 1032, and a memory 1033. The processor 1031 is configured to execute computer instructions that are stored in a computer-readable medium, for example, the memory 1033. The processor 1031 may be a central processing unit (CPU). The network interface 1032 is configured to allow the email certificate generator 103 to transmit and receive data in the network 102. The network interface 1032 may include one or more network interface cards (NICs). The memory 1033 stores data and instructions. As illustrated, the memory 1033 may store an email certificate generating module 1034 which may receive a request for generating an email certificate for an email message from the email module 1010 over the network 102. The email certificate generating module 1034 may then control the processor 1031 to generate an email certificate for the email message. In one embodiment, the email certificate generating module 1034 may generate an email certificate for an email message by encrypting the email message. In one embodiment, the email certificate generating module 1034 may control the processor 1031 to access a memory unit 1039 for a private key, encrypt the email message with the private key to generate an email certificate, and send the email certificate to the user, e.g., as an attachment to an email. In one embodiment, the email certificate may be generated by encrypting the email message and its delivery information, which may include the current time, the time the email message was received or delivered, the sender's email address, the recipient's email address, the subject, the attachment, etc.

Upon the user's request, the email certificate generating module 1034 may also control the processor 1031 to save a copy of the email certificate, e.g., in the storage device 105 of the email certificate system 199.

As shown in FIG. 1, the storage device 105 may be coupled to the email certificate generator 103 and store email certificates therefrom. The storage device 105 may be any commercially available storage devices.

Figure 4:
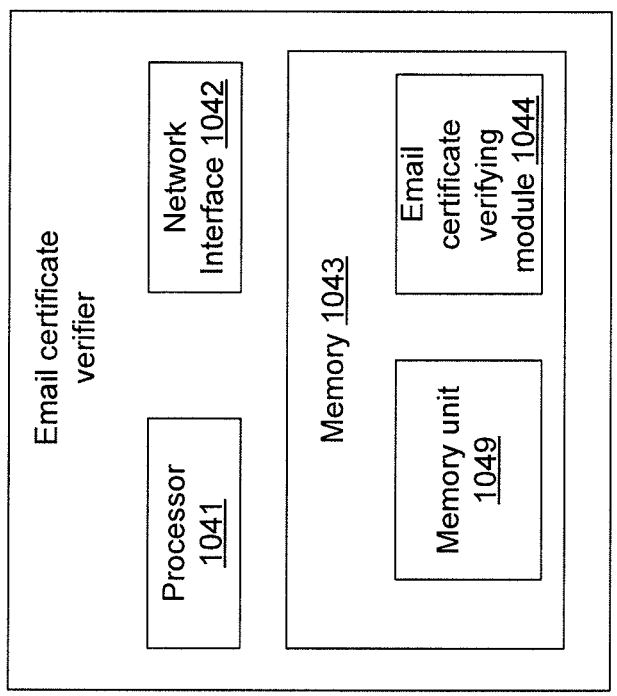
FIG. 4 illustrates a block diagram of an example of an email certificate verifier shown in FIG. 1

FIG. 4 illustrates a block diagram of an example of an email certificate verifier 104 shown in FIG. 1. The email certificate verifier 104 may be coupled to the user devices 101-1 and 101-2 via the network 102 to receive requests for verifying email certificates. The email certificate verifier 104 may include a processor 1041, a network interface 1042, and a memory 1043. The processor 1041 is configured to execute computer instructions that are stored in a computer-readable medium, for example, the memory 1043. The processor 1041 may be a central processing unit (CPU). The network interface 1042 is configured to allow the email certificate verifier 104 to transmit and receive data in the network 102. The network interface 1042 may include one or more network interface cards (NICs). The memory 1043 stores data and instructions. As illustrated, the memory 1043 may store an email certificate verifying module 1044 which may receive a request for verifying an email certificate for an email message from the email module 1010 over the network 102. The request for verifying an email certificate may be from the user who requested the email certificate or a different user. The email certificate verifying module 1044 may then control the processor 1041 to reproduce the email message. In one embodiment, the email certificate verifying module 1044 may reproduce the email message by decrypting the email certificate. In one embodiment, the email certificate verifying module 1044 may control the processor 1041 to access a memory unit 1049 for a public key paired with the private key stored in the memory unit 1039, decrypt the email certificate with the public key, and display the email message.

Although FIG. 1 shows the email certificate generator 103 and email certificate verifier 104 as two separate servers, their functions may be performed by one server (e.g., a single server corresponding to email certificate system 199). In this regard, processors 1011 and 1041 may correspond to a single processor or to separate processors, network interfaces 1012 and 1032 may correspond to a single network interface or to separate network interfaces, and memories 1013 and 1033 may correspond to a single memory or to separate memories.

Figure 5:
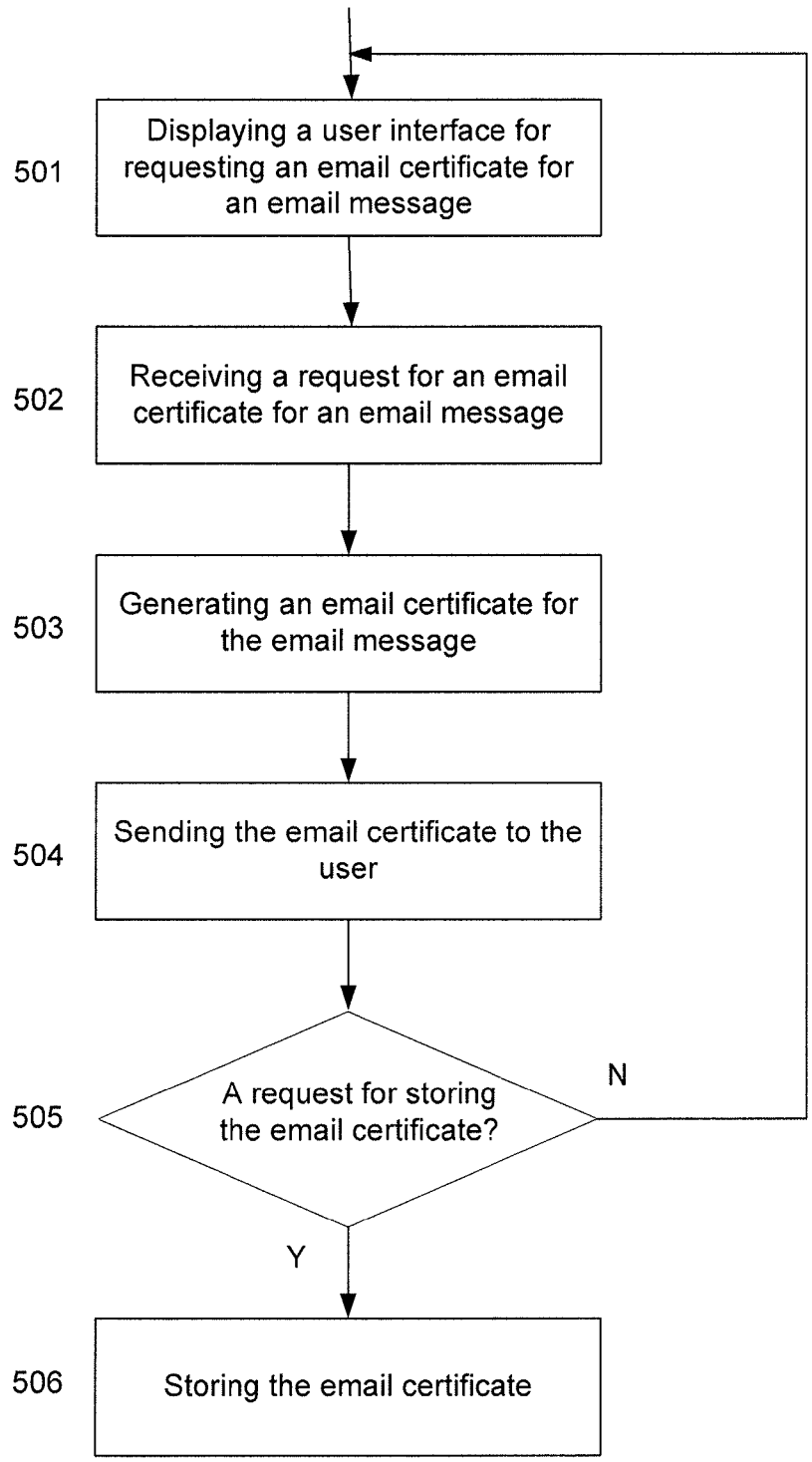
FIG. 5 illustrates a flowchart of an example method for generating an email certificate for an email message.

FIG. 5 illustrates a flowchart of an example method 500 for generating an email certificate for an email message. At 501, a user interface for providing an email certificate for an email message may be displayed, e.g., by providing a "Request Certificate" button (or similar graphical component) on the user interface for displaying the email message. At 502, a request to generate an email certificate for an email message may be received, e.g., from the user interface for providing an email certificate for an email message. In response to the request, at 503, an email certificate may be generated, e.g., encrypting the email message. In one embodiment, the email certificate may be generated by encrypting the email message with a private key. In one embodiment, the email certificate may be generated by encrypting the email message and its delivery information with a private key. The delivery information may include the current time, the time the email message was received or delivered, the sender's email address, the recipient's email address, the subject, the attachment, etc. At 504, the email certificate may be sent to the user, e.g., as an attachment to an email. At 505, it may be determined whether a user request for storing the email certificate is received. If yes, at 506, the email certificate may be stored, and the process ends. Otherwise, the process may return to step 506.

Figure 6:
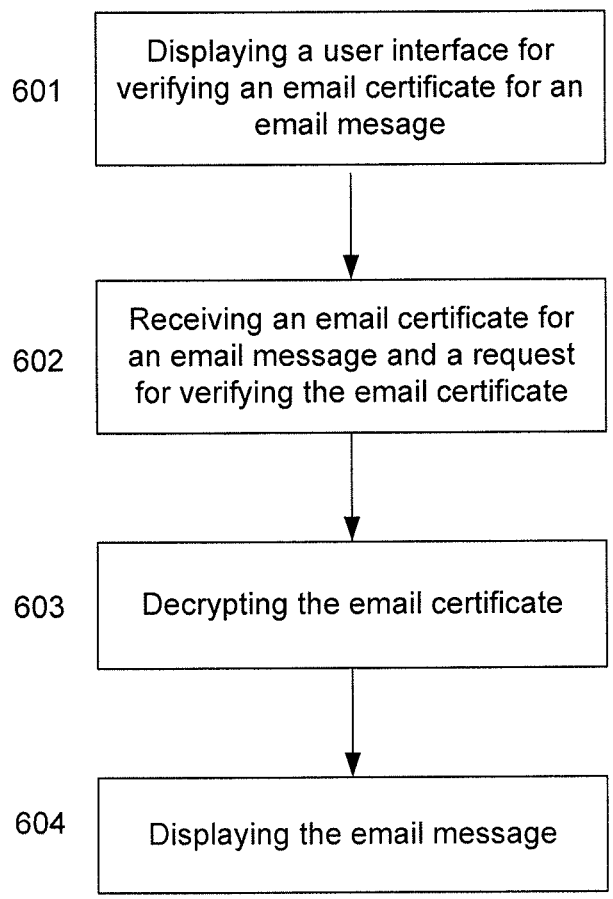
FIG. 6 illustrates a flowchart of an example method for verifying an email certificate for an email message.

FIG. 6 illustrates a flowchart of an example method 600 for verifying an email certificate. At 601, a user interface for verifying an email certificate for an email message may be displayed. The user interface may have a button (or graphical component) for a user to upload an email certificate for an email message and a button (or graphical component) for the user to request verification of an uploaded email certificate. At 602, an uploaded email certificate and a request to verify the email certificate may be received, from the user who requested the email certificate or a different user. At 603, an email message may be reproduced from the uploaded email certificate, e.g., by decrypting the email certificate. In one embodiment, the email certificate may be decrypted with a public key paired with the private key used to generate the email certificate. At 604, the email certificate may be displayed.

In one embodiment, the user interface for verifying an email certificate may display the public key paired with the private key for generating the email certificate, so that a user may use the public key to decrypt the email certificate.

Figure 7:
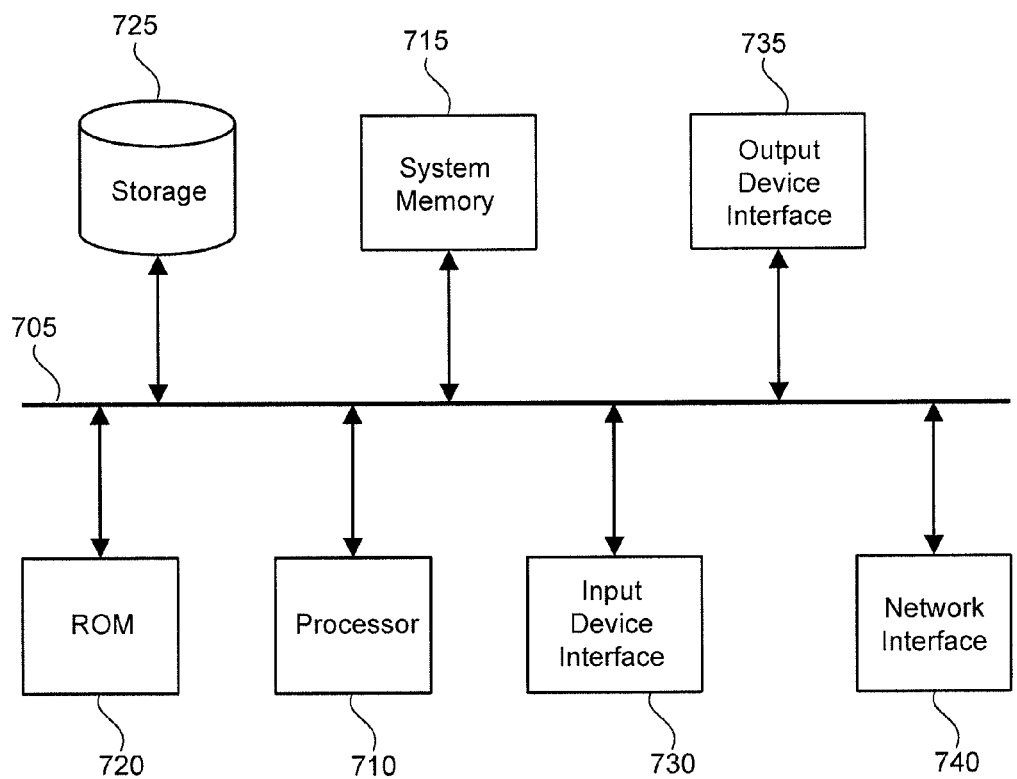
FIG. 7 conceptually illustrates an example electronic system with which some implementations of the subject technology are implemented.

FIG. 7 conceptually illustrates an electronic system 700 with which some implementations of the subject technology are implemented. For example, one or more of the user devices 101-1 and 101-2, the email certificate generator 103 and the email certificate verifier 104 may be implemented using the arrangement of the electronic system 700. The electronic system 700 can be a computer (e.g., a mobile phone, PDA), or any other sort of electronic device. Such an electronic system includes various types of computer readable media and interfaces for various other types of computer readable media. Electronic system 700 includes a bus 705, processing unit(s) 710, a system memory 715, a read-only memory 720, a permanent storage device 725, an input device interface 730, an output device interface 735, and a network interface 740.

The bus 705 collectively represents all system, peripheral, and chipset buses that communicatively connect the numerous internal devices of the electronic system 700. For instance, the bus 705 communicatively connects the processing unit(s) 710 with the read-only memory 720, the system memory 715, and the permanent storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some implementations of the subject technology use a mass-storage device (for example a magnetic or optical disk and its corresponding disk drive) as the permanent storage device 725.

Other implementations use a removable storage device (for example a floppy disk, flash drive, and its corresponding disk drive) as the permanent storage device 725. Like the permanent storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the processes of the subject technology are stored in the system memory 715, the permanent storage device 725, or the read-only memory 720. For example, the various memory units may include instructions for providing an email certificate for an email message in accordance with some implementations. From these various memory units, the processing unit(s) 710 retrieves instructions to execute and data to process in order to execute the processes of some implementations.

The bus 705 also connects to the input and output device interfaces 730 and 735. The input device interface 730 enables the user to communicate information and select commands to the electronic system. Input devices used with input device interface 730 include, for example, alphanumeric keyboards and pointing devices (also called "cursor control devices"). Output device interfaces 735 enables, for example, the display of images generated by the electronic system 700. Output devices used with output device interface 735 include, for example, printers and display devices, for example cathode ray tubes (CRT) or liquid crystal displays (LCD). Some implementations include devices for example a touchscreen that functions as both input and output devices.

Finally, as shown in FIG. 7, bus 705 also couples electronic system 700 to a network (not shown) through a network interface 740. In this manner, the electronic system 700 can be a part of a network of computers (for example a local area network ("LAN"), a wide area network ("WAN"), or an Intranet, or a network of networks, for example the Internet. Any or all components of electronic system 700 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A machine-implemented method for providing an email certificate for an email message, comprising:
   receiving a request from a user for providing an email certificate for an email message, the email message corresponding to email sent or received by the user, the email message comprising delivery information and content;
   generating, by a processor, an email certificate for the email message by encrypting at least the content and delivery information of the email message;
   providing the email certificate to the user;
   receiving the email certificate from a second user and a request for verifying the email certificate;
   decrypting the email certificate to reproduce the email message; and
   providing for display of the email message.

2. The method of claim 1, wherein the generating of the email certificate comprises encrypting at least the content and delivery information of the email message with a private key.

3. The method of claim 1, wherein the email certificate is sent to the user as an attachment to an email.

4. The method of claim 1, wherein the delivery information corresponds to at least one of the current time, the time the email message was received, the time the email message was delivered, a sender's email address, a recipient's email address, a subject, or an attachment.

5. The method of claim 1, further comprising: storing the email certificate for the email message in response to a request from the user.

6. The method of claim 1, further comprising: providing for display of a user interface comprising a graphical component for receiving a request for the email certificate for the email message.

7. The method of claim 1, wherein the email certificate is decrypted with a public key.

8. The method of claim 1, further comprising: reproducing delivery information of the email message when decrypting the email certificate.

9. The method of claim 1, further comprising: providing for display of a user interface comprising a first graphical component for receiving a request for uploading the email certificate and a second graphical component for receiving a request for verifying the email certificate.

10. The method of claim 2, further comprising: providing for display of a public key paired with the private key.

11. A non-transitory computer-readable medium for providing an email certificate for an email message, the computer-readable medium comprising instructions that, when executed by a computer, cause the computer to:
   receive a request from a user for providing an email certificate for an email message, the email message corresponding to email sent or received by the user, the email message comprising delivery information and content;
   generate an email certificate for the email message for proving delivery of the email message;
   provide the email certificate to the user;
   receive the email certificate and a request for verifying the email certificate from a second user;
   decrypt the email certificate to reproduce the email message; and
   provide for display of the email message.

12. The non-transitory computer-readable medium of claim 11, wherein the instructions further cause the computer to: encrypt the email message and its delivery information to generate the email certificate.

13. The non-transitory computer-readable medium of claim 12, wherein the instructions further cause the computer to: encrypt the email message and its delivery information with a private key.

14. A system for providing an email certificate, comprising:
   an email certificate generator which is configured to:
     receive a request from a user for providing an email certificate for an email message, the email message corresponding to email sent or received by the user, the email message comprising delivery information and content;
     generate, by a processor, an email certificate for the email message by encrypting at least the content and delivery information of the email message; and
     provide the email certificate to the user,
   a first memory device for storing a key for the encryption;
   an email certificate verifier configured to:
     receive the email certificate and a request for verifying the email certificate from a second user;
     decrypt the email certificate to reproduce the email message; and
     provide for display of the email message.

15. The system of claim 14, wherein the key is a private key.

16. The system of claim 14, further comprising: a storage device for storing the email certificate for the email message.

17. The system of claim 14, further comprising: a second memory device for storing a public key for the decryption.

* * * * *